(12) United States Patent
Mundhra et al.

(10) Patent No.: US 11,187,644 B2
(45) Date of Patent: Nov. 30, 2021

(54) METHOD AND SYSTEM FOR DETERMINING TOTAL COUNT OF RED BLOOD CELLS IN PERIPHERAL BLOOD SMEAR

(71) Applicant: SIGTUPLE TECHNOLOGIES PRIVATE LIMITED, Bangalore (IN)

(72) Inventors: Dheeraj Mundhra, Kolkata (IN); Himanshu Sharma, Kota Jn. Kota (IN); Shreepad Potadar, Karnataka (IN); Bharath Cheluvaraju, Bangalore (IN); Tathagato Rai Dastidar, Bangalore (IN)

(73) Assignee: Sigtuple Technologies Private Limited, Bangalore (IN)

( * ) Notice: Subject to any disclaimer, the term of this patent is extended or adjusted under 35 U.S.C. 154(b) by 0 days.

(21) Appl. No.: 16/344,274

(22) PCT Filed: Aug. 21, 2018

(86) PCT No.: PCT/IB2018/056304
§ 371 (c)(1),
(2) Date: Apr. 23, 2019

(87) PCT Pub. No.: WO2019/197890
PCT Pub. Date: Oct. 17, 2019

(65) Prior Publication Data
US 2021/0333196 A1      Oct. 28, 2021

(30) Foreign Application Priority Data

Apr. 9, 2018   (IN) .............................. 201841013568

(51) Int. Cl.
*G06K 9/00*       (2006.01)
*G01N 15/14*     (2006.01)
(Continued)

(52) U.S. Cl.
CPC ....... *G01N 15/1475* (2013.01); *G06K 9/0014* (2013.01); *G06K 9/00147* (2013.01);
(Continued)

(58) Field of Classification Search
CPC ....... G01N 15/1475; G01N 2015/1006; G01N 2015/1486; G06K 9/0014; G06K 9/00147;
(Continued)

(56) References Cited

U.S. PATENT DOCUMENTS

| | | | | |
|---|---|---|---|---|
| 4,453,266 A | * | 6/1984 | Bacus | ....................... G06T 7/64 356/39 |
| 2017/0098303 A1 | * | 4/2017 | Sun | ......................... G01N 33/49 |
| 2017/0178321 A1 | * | 6/2017 | Nieves Alicea | ..... G06K 9/6267 |

OTHER PUBLICATIONS

International Search Report from PCT Application No. PCT/IB2018/056304, dated Nov. 26, 2018, pp. 1-3.
(Continued)

*Primary Examiner* — Avinash Yentrapati
(74) *Attorney, Agent, or Firm* — Foley & Lardner LLP

(57) ABSTRACT

The present disclosure relates to a method and system for determining Total Count (TC) of RBCs in a Peripheral Blood Smear (PBS). The system receives a plurality of images from the monolayer of the PBS. Further, the system extracts, segments and identifies RBCs in each of the plurality of images using deep learning models. The system computes a value of each variable of a set of variables for each of the plurality of images. The set of variables includes foreground non-pallor area, density of RBCs, cell count, cell count ratio, foreground area and foreground hole-filled area. Furthermore, the system computes statistical parameters for each variable, over the plurality of images. The statistical parameters are provided as an input to supervised learning model, to determine TC of RBCs. Thus, the TC estimation
(Continued)

system provides an efficient and robust method for estimating TC of RBCs using plurality of images of the PBS.

16 Claims, 9 Drawing Sheets

(51) Int. Cl.
 *G06K 9/62* (2006.01)
 *G01N 15/10* (2006.01)
(52) U.S. Cl.
 CPC ........... *G06K 9/621* (2013.01); *G06K 9/6267* (2013.01); *G01N 2015/1006* (2013.01); *G01N 2015/1486* (2013.01); *G06K 2209/05* (2013.01)
(58) Field of Classification Search
 CPC ... G06K 9/621; G06K 9/6267; G06K 2209/05
 See application file for complete search history.

(56) References Cited

OTHER PUBLICATIONS

Written Opinion from PCT Application No. PCT/IB2018/056304, dated Nov. 26, 2018, pp. 1-4.

\* cited by examiner

METHOD AND SYSTEM FOR DETERMINING TOTAL COUNT OF RED BLOOD CELLS IN PERIPHERAL BLOOD SMEAR

CROSS-REFERENCE TO RELATED APPLICATIONS

The present application is a National Stage of PCT Application No. PCT/IB2018/056304, filed Aug. 21, 2018, which claims priority to Indian Patent Application No. 201841013568, filed Apr. 9, 2018. The contents of both applications are incorporated herein by reference in their entirety.

FIELD OF THE DISCLOSURE

The present subject matter relates to study of blood cells/hematology. The present subject matter relates more particularly, but not exclusively, to a method and a system for determining Total Count (TC) of Red Blood Cells (RBCs) in a peripheral blood smear.

BACKGROUND

Complete blood count (CBC) or TC of individual blood cells like RBCs, WBCs and platelets is a basic screening hematology test used to diagnose an individual with abnormalities and for determining severity of health conditions. Abnormally high or low counts of blood cells may indicate the presence of many forms of diseases. Hence, blood counts are among the most commonly performed blood tests in the field of hematology, as they can provide an overview of general health status of a patient. TC of RBCs may be used for diagnosis of abnormalities like anemia (decrease in TC of RBCs), polycythemia (increase in TC of RBCs) and the like. Few existing methodologies use hematology analyzers for determining various parameters from a blood sample. Hematology analyzers use techniques such as flow cytometry to estimate TC of blood cells etc., in a blood sample. However, the hematology analyzers measure the type of blood cell by analyzing data about the size and aspects of light as they pass through the cells. The amount of light scattered by the blood cells are mainly dependent on the size of the blood cells. Hence, certain abnormal cells in the blood sample may not be identified correctly, requiring manual review of the instrument's results for identification of any abnormal cells which could affect the estimation of TC of blood cells. Moreover, the analyzers mentioned above use reagents in every analysis, thereby, increasing the cost.

Few other existing methodologies involve use of Hemocytometers (counting chambers that hold a specified volume of diluted blood and divide it with grid lines) for calculating the number of RBCs per litre of blood. This technique depends on manual counting and manual counting is subjected to sampling error because only few cells are counted compared to automated analysis.

Few other existing methodologies illustrate the estimation of TC of blood cells using image-based analysis. Images of a blood smear are captured and used for estimation of TC of blood cells. The existing image-based analysis methodologies mainly employ cell segmentation, thresholding, feature extraction for estimating TC of blood cells. Further, the existing methodologies estimate count of blood cells by capturing random Field of Views (FoVs) of the blood smear for estimating TC of blood cells. Estimation of TC of blood cells using random FoV results in a biased estimation of TC of blood cells. The existing methodologies are applicable when the stain in blood smear is constant and the blood smear as well as the stain quality is maintained using high cost devices, hence leading to an overall high cost of the system and reagents.

The information disclosed in this background of the disclosure section is only for enhancement of understanding of the general background of the invention and should not be taken as an acknowledgement or any form of suggestion that this information forms the prior art already known to a person skilled in the art.

SUMMARY

In one embodiment, the present disclosure discloses a method for estimating Total Count (TC) of Red Blood Cells (RBCs) in a blood smear. The method comprises receiving a plurality of images of a monolayer of a Peripheral Blood Smear (PBS) in a binary format by an image capturing unit configured to scan the monolayer of the PBS. The plurality of patches comprising an RBC is extracted from each of the plurality of images. Further, the method comprises estimating a value of a set of variables for each of the plurality of images, the set of variables comprising a Foreground Non-Pallor Area (FGNPA) and a density of the RBCs. The value of the FGNPA of an image among the plurality of images is estimated by calculating a ratio of a value of Foreground Area (FGA) of the image and a mean value of Non-Pallor Area (NPA) of the identified RBCs, present in the image. The foreground area is calculated by aggregating NPA of blood cells of size of RBC. The value of the density of the RBCs of an image among the plurality of images is estimated by calculating a ratio of the value of FGA and total area of the image. The total area of the image is a summation of the FGA and background area in the image and lastly, the set of variables are provided to a supervised learning model for estimating the TC of the RBCs.

A TC estimation system, for estimating Total Count (TC) of Red Blood Cells (RBCs) in a blood smear. The TC estimation system comprises a processor and a memory. The memory is communicatively coupled with the processor. The processor is configured to receive, a plurality of images of a monolayer of a Peripheral Blood Smear (PBS) in a binary format by an image capturing unit configured to scan the monolayer of the PBS. The plurality of patches comprising RBC is extracted from each of the plurality of images. Further the processor estimates a value for each variable of a set of variables for each of the plurality of images, the set of variables comprising a Foreground Non-Pallor Area (FGNPA) and a density of the RBCs. A value of the FGNPA of an image among the plurality of images is estimated by calculating a ratio of a value of Foreground Area (FGA) of the image and a mean value of Non-Pallor Area (NPA) of the RBCs identified in the image. The foreground area is calculated by aggregating NPA of blood cells of size of RBC. A value of the density of the RBCs of an image among the plurality of images is estimated by calculating a ratio of the value of FGA and total area of the image. The total area of the image is a summation of the FGA and background area in the image and the set of variables are provided to a supervised learning model for estimating the TC of the RBCs.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
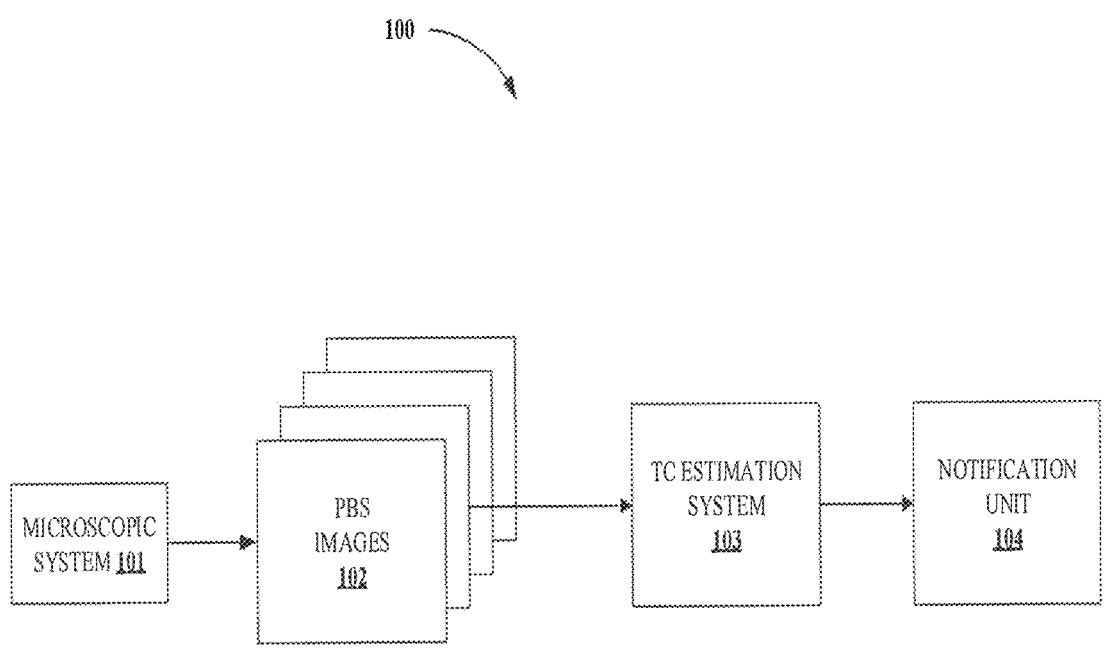
FIG. 1 shows a block diagram illustrative of an environment for determining Total Count (TC) of RBCs in a Peripheral Blood Smear (PBS) in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus preceded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relate to a method and system for determining Total Count (TC) of RBCs in a Peripheral Blood Smear (PBS). The TC estimation system receives a plurality of images from the monolayer of the PBS. Each of the plurality of images are converted into a binary format. Further, the system extracts, segments and identifies RBCs in each of the plurality of images using deep learning models. The system computes a value of each variable of a set of variables for each of the plurality of images. The set of variables includes foreground non-pallor area, density of RBCs, cell count, cell count ratio, foreground area and foreground hole-filled area. Furthermore, the system computes statistical parameters for each variable, over the plurality of images. The statistical parameters are provided as an input to supervised learning model, to determine TC of RBCs. Further, the said system and method has high degree of correlation between the estimated RBC TC and actual RBC TC and is stain agnostic. Thus, the TC estimation system provides an efficient and robust method for estimating TC of RBCs using plurality of images of the PBS.

FIG. 1 shows a block diagram illustrative of an environment 100 for estimating TC of RBCs in the PBS. The environment 100 comprises a microscopic system 101, Peripheral Blood Smear (PBS) images 102, a TC estimation system 103 and a notification unit 104. The PBS is a thin layer of blood corresponding to a blood sample, smeared on a glass microscope slide and then stained in such a way as to allow the various blood cells to be examined microscopically. The PBS images 102 comprises a plurality of images of the PBS. The PBS images 102 may correspond to a blood sample of a subject. In an embodiment, the subject may be a patient or any living being. In an embodiment, the plurality of images may be of a monolayer region of the PBS. The PBS images 102 are provided as input to the TC estimation system 103. The TC estimation system 103 receives the PBS images 102 and processes the PBS images 102 in order to determine the TC of RBCs in the PBS. The PBS images 102 may be received from the microscopic system 101. The PBS images 102 may be high resolution images or enhanced microscopic images of the PBS captured by an image capturing unit of the microscopic system 101. Each of the PBS images 102 received from the microscopic system 101 may be a RGB color image. The TC estimation system 103 converts each of the PBS images 102 into a binary image. Further, the TC estimation system 103 computes a value for each variable of a set of variables for each of the PBS images 102. Further, the TC estimation system 103 computes a set of statistical parameters for each variable, over the plurality of images. The set of statistical parameters are provided as an input to supervised learning model, to determine TC of RBCs. In an embodiment, the TC of RBCs may be estimated in terms of RBCs/μL (microlitre). The determined TC of RBCs is provided to the notification unit 104, which may provide an indication of the determined TC of RBCs to a clinician or any person analyzing the PBS images 102.

In an embodiment, the PBS images 102, may include, the plurality of images of the PBS in the monolayer of the PBS. The PBS images 102 may be retrieved from the microscopic system 101. The microscopic system 101 may be any system which is configured to retrieve microscopic images of the PBS and provide the microscopic images of the PBS to the TC estimation system 103. In an embodiment, the microscopic system 101 may comprise a microscope, a stage and the image capturing unit for retrieving enhanced microscopic images of the PBS. The stage may be configured to hold the PBS. The microscopic device 101 may be configured to focus on region of interest in the sample. The PBS has three main regions namely, clumped region, the monolayer region, and feather edge region. Density of blood decreases in the order of clumped region, monolayer region and feather edge region. Therefore, the PBS images 102 acquired from the clumped region and the feather edge region of the PBS results in over or under estimation of TC of RBCs respectively. In the monolayer region, all the cells are well separated or slightly touching each other, which result in unbiased estimation of TC of RBCs. Therefore, the microscopic system 101 may optimally scan the PBS to determine the monolayer region of the PBS. The image capturing unit may be configured to capture enhanced microscopic images of the PBS in the monolayer region.

In an embodiment, the PBS images 102 may comprise 120 images covering the monolayer region of the PBS. The formats of the type of PBS images 102 may be one of, but not limited to, Resource Interchange File Format (RIFF), Joint Photographic Experts Group (JPEG/JPG), BitMaP (BMP), Portable Network Graphics (PNG), Tagged Image File Format (TIFF), Raw image files (RAW), Digital Imaging and Communication (DICOM), Moving Picture experts group (MPEG), MPEG-4 Part 14 (MP4), etc.

In an embodiment, the notification unit 104 may be used to notify the estimated TC of RBCs to a clinical specialist examining the PBS images 102. The notification unit 104, may include, but are not limited to, a display device, a report generation device or any other device capable of providing a notification. In an embodiment, the notification unit 104 may be a part of the TC estimation system 103 or may be associated with the TC estimation system 103.

In an embodiment, the display device may be used to display the TC of RBCs estimated by the TC estimation system 103. The display device may be one of, but not limited to, a monitor, a Liquid Crystal Display (LCD), a Light Emitting Diode (LED) display and/or any other module present which is capable of displaying the TC of RBCs.

In an embodiment, the report generation device may be used to generate a report comprising details of the TC of RBCs estimated by the TC estimation system 103.

Figure 2:
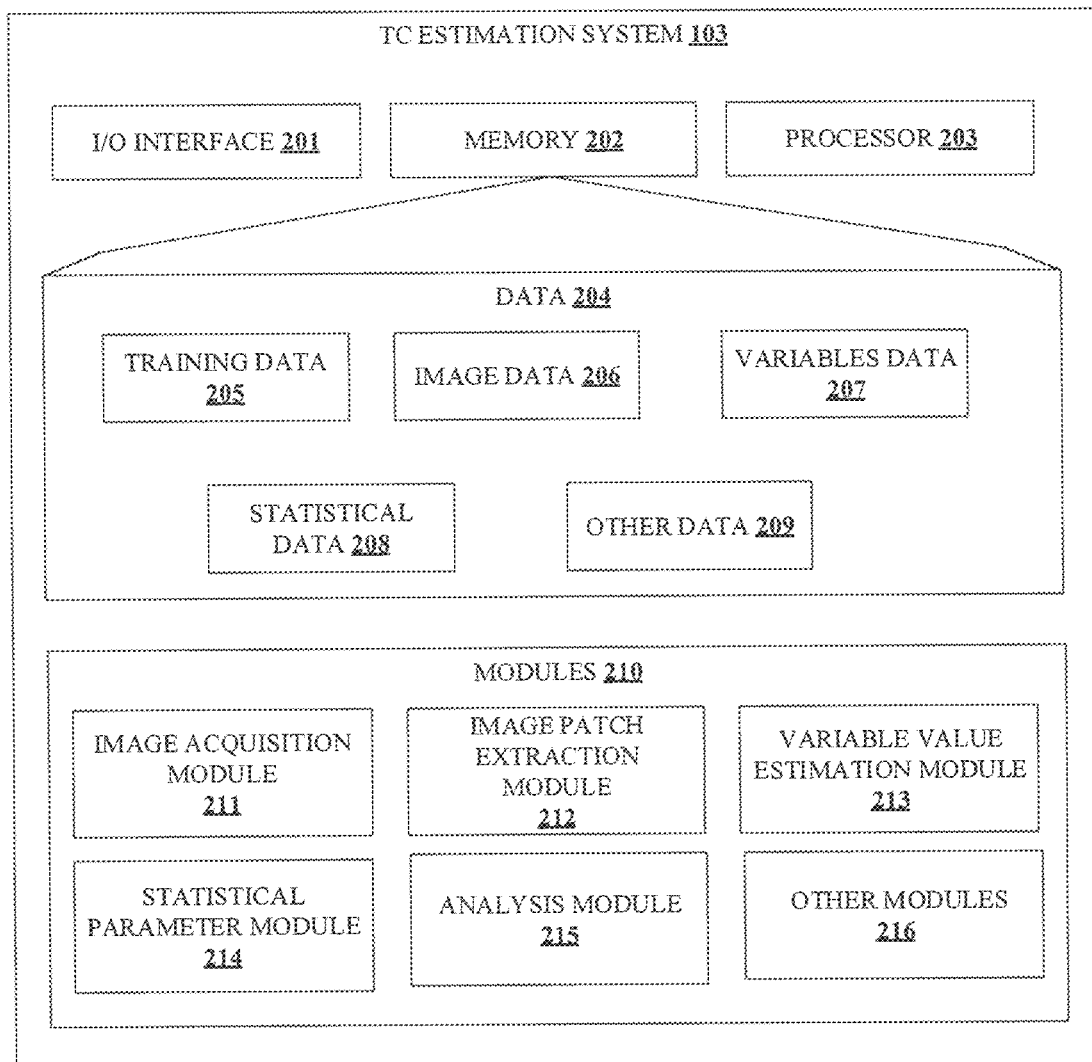
FIG. 2 shows an exemplary block diagram of a TC estimation system for determining Total Count (TC) of RBCs in a Peripheral Blood Smear (PBS) in accordance with some embodiments of the present disclosure.

FIG. 2 shows an exemplary block diagram of a TC estimation system 103 for estimating TC of RBCs in the PBS, in accordance with some embodiments of the present disclosure. The TC estimation system 103 may include at least one processor 203 and a memory 202 storing instructions executable by the at least one processor 203. The processor 203 may comprise at least one data processor for executing program components for executing user or system-generated requests. The memory 202 is communicatively coupled to the processor 203. The TC estimation system 103 further comprises an Input/Output (I/O) interface 201. The I/O interface 201 is coupled with the processor 203 through which an input signal or/and an output signal is communicated. In an embodiment, the I/O interface 201 provides the PBS images 102 to the TC estimation system 103. In another embodiment, the I/O interface 210 couples the notification unit 104 to the TC estimation system 103.

In an embodiment, the processor 203 may implement machine learning models for analyzing the PBS images 102. The processor 203 may implement any existing machine learning models which may include, but are not limited to, decision tree learning, association rule learning, artificial neural networks or deep learning, inductive logic programming, support vector machines, clustering, Bayesian networks, reinforcement learning, representation learning, similarity and metric learning, genetic algorithms, rule-based machine learning.

In an embodiment, data 204 may be stored within the memory 202. The data 204 may include, for example, training data 205, image data 206, variables data 207, statistical data 208 and other data 209.

In an embodiment, the machine learning models may be trained to analyze the PBS images 102 using the training data 205. The training data 205 may comprise few PBS images from the PBS images 102. In an embodiment, for training the TC estimation system 103, random patches are extracted from each of the few PBS images. Further, a blood cell in each of the random patches are labeled as one of RBC and non-RBC by experts based on various parameters related to the blood cell. The labeled patches are used for training the deep learning model. For instance, patch 1 is extracted from a PBS image. The blood cell in patch 1 is found to be a RBC. Hence, the patch 1 is labeled as RBC by the expert. The patch 1 is used for training the TC estimation system 103. Further, when the TC estimation system 103, encounters a patch 2 similar to the patch 1, it may automatically classify the blood cell in patch 2 as RBC. The TC estimation system 103 may be trained using a vast set of images from the training data 205. Thereby, the TC estimation system 103 may be able to efficiently identify RBCs in each of the PBS images 102. The TC estimation system 103 discards the WBC and platelets and any overlapping cell in each of the PBS images 102.

In an embodiment, the image data 206 refers to the properties of each of the PBS images 102. The properties may include, but are not limited to, resolution or quality of the PBS images 102, sharpness of the PBS images 102, image size, and image format. In an embodiment, the image data may also comprise plurality of image patches extracted by the TC estimation system 103.

In an embodiment, the variable data 207 refers to set of variables computed by the TC estimation system 103 for each of the PBS images 102. The variable data 207 stores value corresponding to each variable of the set of variables computed for each of the PBS images 102.

In an embodiment, the statistical data 208 refers to the set of statistical parameters computed by performing statistical operations on each variable from the set of variables over the PBS images 102. The statistical operations may include one of, but is not limited to mean, standard deviation and percentiles. For an instance, the TC estimation system 103 may compute mean of a first variable over the PBS images 102 and store the mean in the statistical data 208.

In an embodiment, the other data 209 may include weighing parameters data. The weighing parameters data refers to different parameters for assigning weight to each of the PBS images 102. The weighing parameters data may be based on data present in the image data 206. Each of the PBS images 102 may be assigned a weight based on one or more parameters present in the weighing parameters data.

In an embodiment, the data 204 in the memory 202 is processed by modules 210 of the TC estimation system 103. As used herein, the term module may refer to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 210 when configured with the functionality defined in the present disclosure will result in a novel hardware.

In one implementation, the modules 210 may include, for example, an image acquisition model 211, an image patch extraction module 212, a variable value estimation module 213, a statistical parameter module 214, an analysis module 215 and other modules 216. It will be appreciated that such aforementioned modules 210 may be represented as a single module or a combination of different modules.

In an embodiment, the image acquisition module 211 acquires the PBS images 102 (enhanced images of the PBS) from the microscopic system 101, for processing and for estimating a TC of RBCs. The image acquisition module 211 may convert each of the PBS images 102 into a binary image for further processing. The resulting images are a binary form of each of the PBS images 102. The binary form of each of the PBS images 102 may be referred to as plurality of binary images hereafter in the present disclosure.

In an embodiment, the image patch extraction module 212 may extract and segment plurality of image patches from each of the plurality of binary images. Each of the plurality of image patches comprises the blood cell. The blood cell may be one of RBC, WBC and platelet. The area of the plurality of image patches may be pre-defined. In an embodiment, area of the blood cells in the PBS may be considered as a patch and may be extracted. In an embodiment, the image patch extraction module 212 extracts plurality of image patches, such that each of the plurality of image patches comprises a blood cell of size of RBC.

In an embodiment, the image patch extraction module 212 may classify the blood cell in each of the plurality of image patches into one of RBC and non-RBC. The extraction of the plurality of image patches may be performed using pre-trained Artificial Intelligence (AI) models or deep learning models. The pre-trained AI models may be a combination of convolutional neural networks and statistical models. Each of the plurality of image patches corresponding to a binary image of the plurality of binary images comprising the RBC are stored.

In an embodiment, the variable value computation module 213 estimates a value for each variable of the set of variables for each of the plurality of binary images. The set of variables may include, but are not limited to, Foreground Non-Pallor Area (FGNPA), Density of RBCs, cell count, cell count ratio, Foreground Area (FGA) and Foreground Hole-filled area (FHA). The value for each variable of the set of variables may be estimated by employing known image processing techniques.

In an embodiment, the statistical parameter module 214 computes a set of statistical parameters corresponding to the set of variables. The statistical parameters are computed by performing statistical operations on each variable from the set of variables over the plurality of binary images. The statistically operated data may be referred to as the set of statistical parameters. The statistical operations may include one of, but is not limited to, mean, standard deviation and percentiles. For an instance the statistical parameter module 214 may compute mean of a first variable computed for each of the plurality of binary images. Further, the statistical parameter module 214 may compute standard deviation of a second variable over the plurality of binary images. In an embodiment, the set of variables may comprise six independent variables. The statistical operations to be performed on each of the six independent variables over the plurality of binary images may be pre-defined.

For an instance, the set of statistical parameters may comprise six mean values corresponding to the six independent variables.

In an embodiment, the analysis module 215 estimates the TC of RBCs using the set of statistical parameters. The set of statistical parameters is provided to a supervised learning model to estimate the TC of RBCs in the blood smear. The supervised learning model may be one of, but not limited to, a Random Forest Regression Model (RFRM), a Support Vector Regression Model (SVRM), a Linear Regression Model (LRM), a Gradient Boosting Regression Model and k-Nearest Neighbors (k-NN) regression Model.

In an embodiment, the other modules 216, may include, but are not limited to, a report generation module.

In an embodiment, the report generation module may be used to generate a report comprising details of the TC of RBCs estimated by the TC estimation system 103. It may further indicate the grade of the estimation of TC of RBCs.

Figure 3:
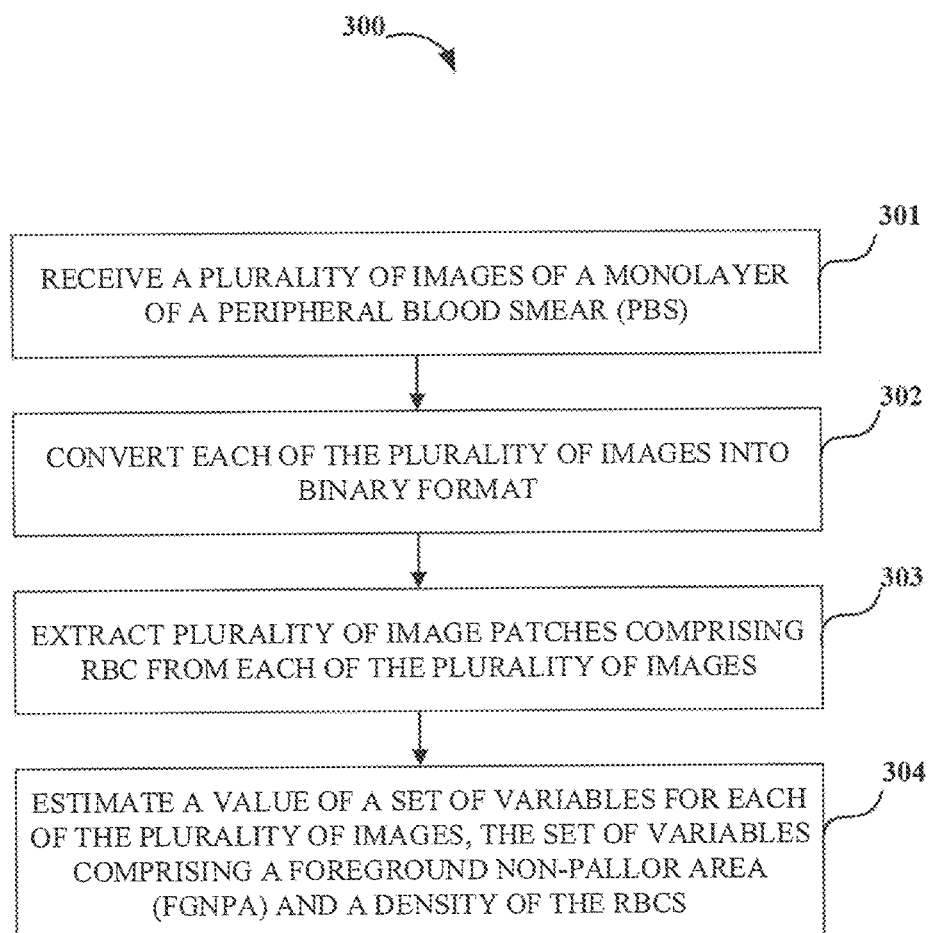
FIG. 3 shows an exemplary flowchart illustrating method steps for estimating Total Count (TC) of RBCs in a Peripheral Blood Smear (PBS) in accordance with some embodiments of the present disclosure.
Figure 4:
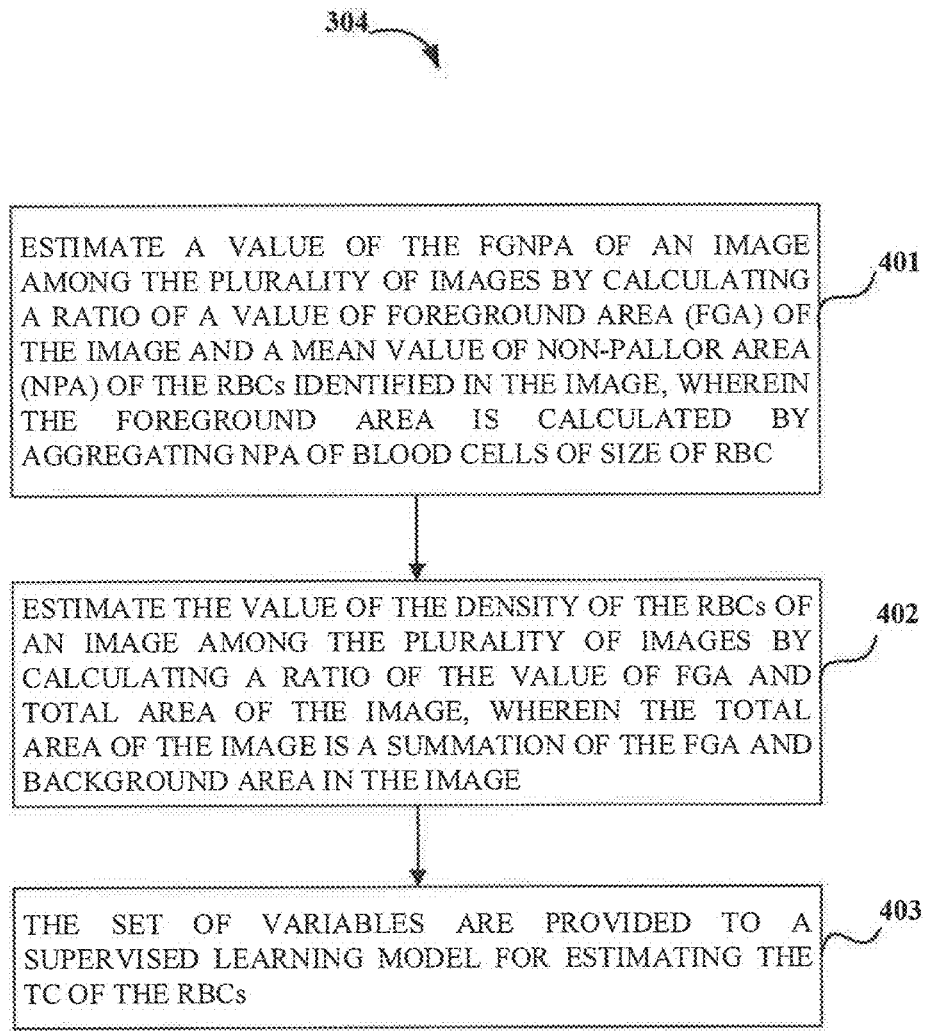
FIG. 4, shows an exemplary flowchart illustrating method steps for estimation of the value of each variable of the set of variables and TC of RBCs in the PBS, in accordance with some embodiments of the present disclosure

FIG. 3 and FIG. 4 show an exemplary flowchart illustrating method steps 300 and 304 respectively for estimating Total Count (TC) of RBCs in a Peripheral Blood Smear (PBS), in accordance with some embodiments of the present disclosure.

As illustrated in FIG. 3 and FIG. 4, the method comprises one or more blocks for estimating TC of RBCs in PBS. The method 300 and method 304 may be described in the general context of computer executable instructions. Generally, computer executable instructions can include routines, programs, objects, components, data structures, procedures, modules, and functions, which perform particular functions or implement particular abstract data types.

The order in which the method 300 and method 304 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 5A:
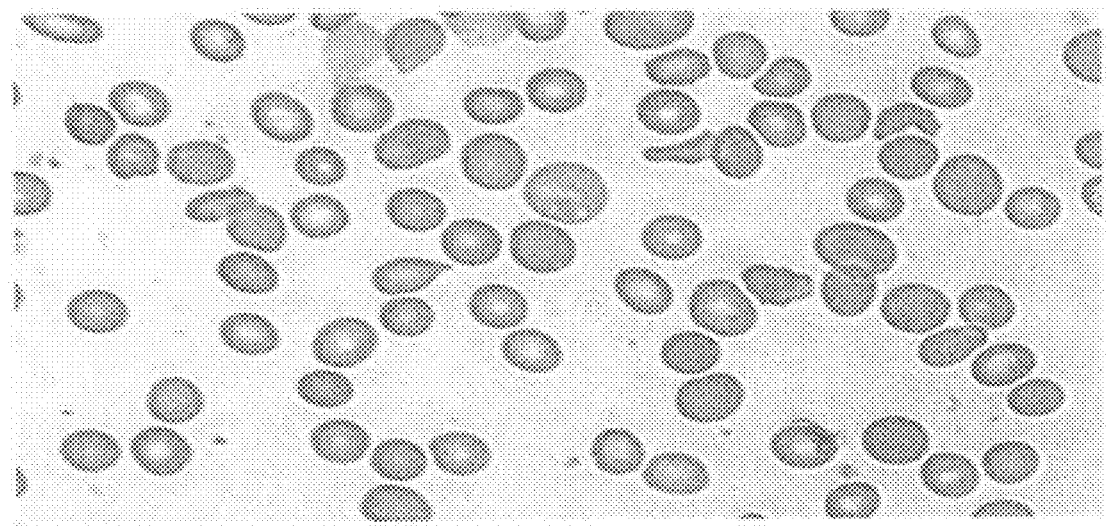
FIGS. 5A, 5B, 5C, 5D and 5E show exemplary images of a PBS in accordance with some embodiments of the present disclosure.

At step 301, the PBS images 102 are acquired by the image acquisition module 211, from the microscopic system 101, for processing for processing and for estimating a TC of RBCs. The PBS images 102 may be captured by the imaging unit of the microscopic system 101 in the monolayer region of the PBS. FIG. 5A indicates an a portion of the PBS image acquired by the image acquisition module 211. Illustrated FIG. 5A is an image acquired in the monolayer region of the PBS. The PBS image illustrated in FIG. 5A may be referred to as a first image, hereafter, in the present disclosure. In an embodiment, the image acquisition module 211 may acquire 120 images of the PBS. Each of the 120 images may relate to different Field of View (FOV) of the monolayer region of the PBS.

Figure 5B:
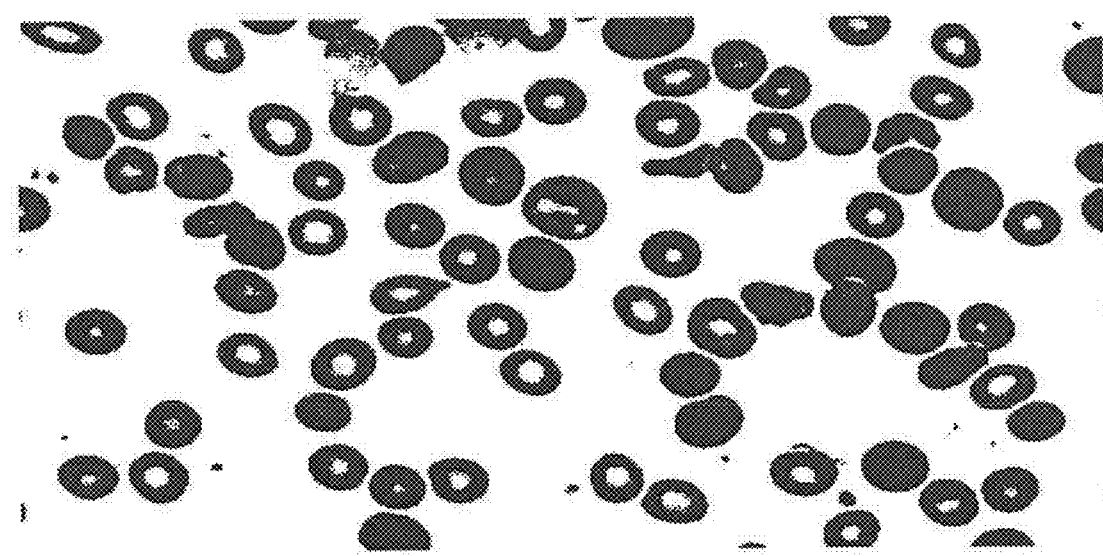

At step 302, each of the PBS images 102 is converted into binary format by the image acquisition module 211. Any known image processing technique may be employed for converting each of the PBS images 102 into corresponding binary image. The PBS images 102 may be a RGB color image. The RGB color image may be realized as one of a green plane, blue plane and red plane by using suitable filters. In an embodiment, a green plane of each of the PBS images 102 is obtained. Further, customized Otsu thresholding may be applied on the green plane of each of the PBS images 102 to obtain the plurality of binary images. FIG. 5B indicates binary form of the first image. Otsu thresholding has been applied to the first image to convert it into a binary image as illustrated in FIG. 5B. The binary form of the first image may be referred to as a second image hereafter in the present disclosure.

At step 303, plurality of image patches are extracted from each of the plurality of binary images by the image patch extraction module 212. The image patch extraction module 212 may extract and segment plurality of image patches extracted from each of the plurality of binary images. Each of the plurality of image patches comprises the blood cell. The blood cell may be one of RBC, WBC and platelet. The area of each of the plurality of image patches may be pre-defined before extraction. In an embodiment, the blood cells in the PBS, in the size range of the RBC (3-8 microns) may be considered as a patch and may be extracted. The plurality of image patches may be extracted using any existing image processing techniques used for extraction of objects from an image. In an embodiment, the image patch extraction module 212 may employ at least one of image processing techniques, pre-learnt statistical models, machine learning methods and rule-based methods or any other method which may be used for extraction of the plurality of image patches.

Figure 5C:
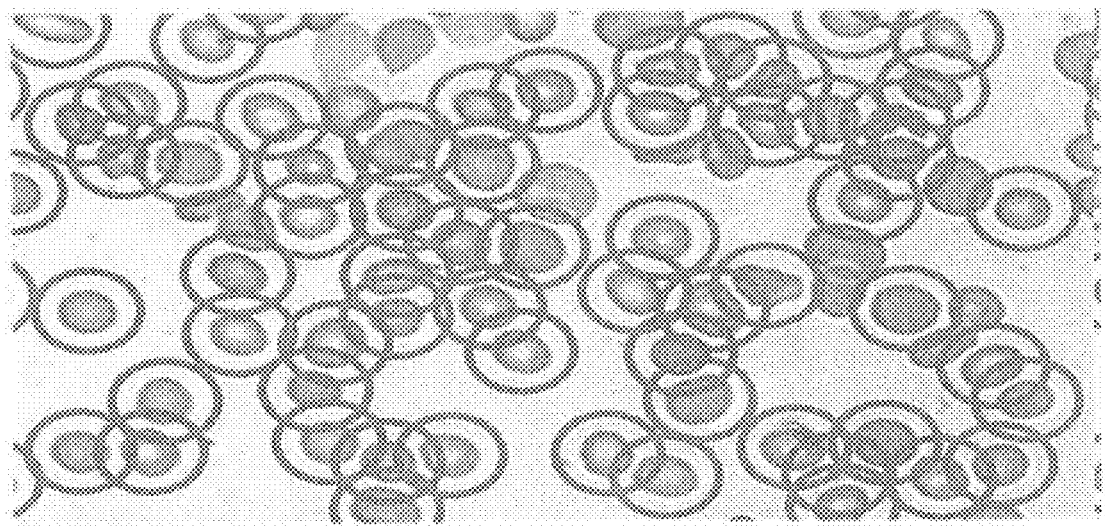

The extraction of the plurality of image patches may be performed using pre-trained Artificial Intelligence models or deep learning models. The pre-trained artificial Intelligence models may be a combination of convolutional neural networks and statistical models. Each of the plurality of image patches corresponding to a binary image of the plurality of binary images comprising the RBC are stored in the image data 206. The image patch extraction module 212 is trained using the training data 205 for extraction and the parameters considered for extraction and classification. The parameters considered for extraction and classification may be one of shape of the blood cell, constituents of the blood cell, size of the blood cell and the like. In an embodiment, the image patch extraction module 212 may neglect the image patch with over lapping cells. FIG. 5C indicates the RBCs identified in the second image. The circled regions illustrated in the FIG. 5C indicate the RBCs identified in the second image.

At step 304, the value of each variable of the set of variables is estimated for each of the plurality of binary images by the variable value estimation module 213. The set of variables may include, but are not limited to, Foreground Non-Pallor Area (FGNPA), Density of RBCs, cell count, cell count ratio, Foreground Area (FGA) and Foreground Hole-filled area (FHA). The value of each variable of the set of variables may be computed by employing statistical models and known image processing techniques. The set of variables may include six independent variables as indicated above and may be referred to as a first variable (FGNPA), a second variable (density of RBCs), a third variable (FHA), a fourth variable (cell count), a fifth variable (cell count ratio) and a sixth variable (FGA) hereafter in the present disclosure.

FIG. 4, shows an exemplary flowchart illustrating method steps 304 for estimation of the value of each variable of the set of variables and TC of RBCs in the PBS, in accordance with some embodiments of the present disclosure.

Figure 5D:
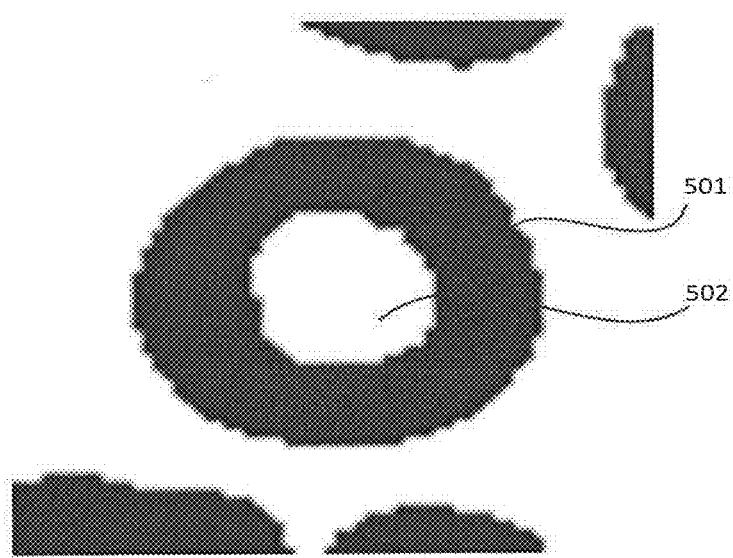

At step 401, the variable value estimation module 213 estimates a value of FGNPA. In an embodiment, RBCs have a shape similar to that of a torus (doughnut). The RBC comprises a center region called pallor and the region surrounding the pallor is termed as a non-pallor region. FIG. 5D illustrates an identified RBC present in an image patch. The image patch comprising the identified RBC is extracted from the second image. The center region 502 is the pallor of the identified RBC and the region 501 surrounding the region 502 is the non-pallor region of the RBC. The value of each of the six variables computed for a binary image of the plurality of binary images is described hereafter in the present disclosure.

In an embodiment, the value of the first variable (FGNPA) is estimated by the variable value estimation module 213. The first variable is determined by calculating a ratio of a value of Foreground Area (FGA) in the binary image and a mean value of Non-Pallor Area (NPA) of the identified RBCs, present in the binary image. The foreground area is calculated by aggregating NPA of blood cells of size of RBC. The size of RBC lies in the range of 3-8 microns. The NPA of each of the identified RBCs in the binary image is estimated and mean is computed. As illustrated in FIG. 5D, the area of the region 501 indicates the NPA of the identified RBC in the second image. Similarly, the NPA is determined for each RBC identified in the second image.

Figure 5E:
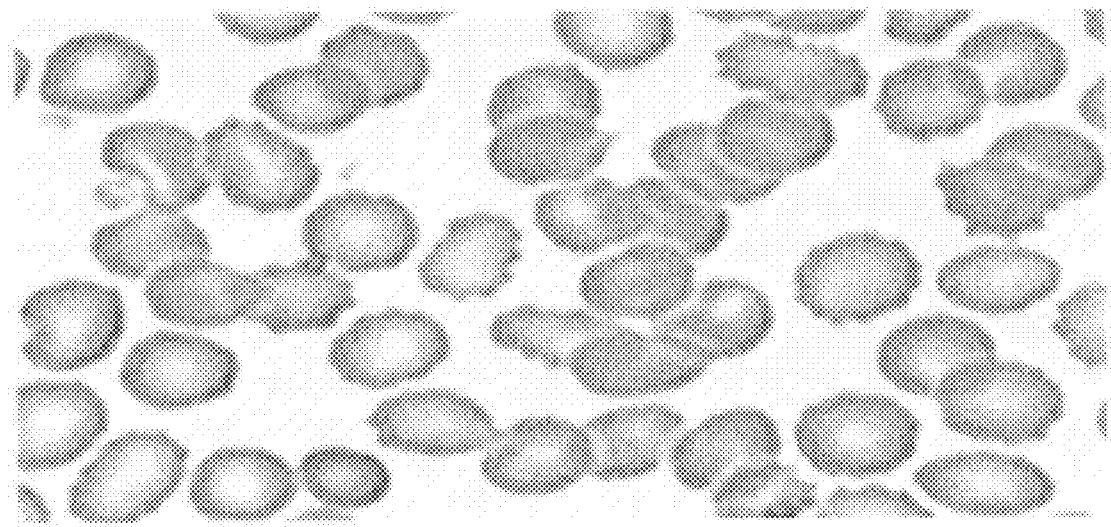

In an embodiment, the mean value of Non-Pallor Area (NPA) of the identified RBCs is a denominator computed during estimation of the first variable. The NPA of only the RBC cells identified by the image patch extraction module 212 are considered for computing the denominator, which is a proxy for average size of an RBC cell present in the PBS image. The computation of denominator by considering the NPA of only the RBC cells identified by the image patch extraction module 212 ensures that the estimation of TC of RBCs is accurate for samples with overlapping cells. Overlapping/clumping occurs in the cases of high RBC TC samples or when the image is captured from the clumped region of the slide. FIG. 5E indicates an image of the PBS captured in the clumped region of the PBS. The image illustrated in FIG. 5E may be referred as a third image. The third image comprises overlapped/clumped blood cells. The mean NPA is computed for all the cells present in the third image. It was observed that the value of the denominator of the first variable is overestimated and thereby, the value of the first variable is underestimated. The variable value estimation module 213 thus considers only the identified RBCs (excluding the overlapping/clumped cells) to compute mean NPA. Therefore, the TC estimation system 103 is more robust when compared to any of the existing technologies.

At step 402, the variable value estimation module 213 estimates the value of second variable (density of RBCs). The value of the second variable is estimated by the variable value estimation module 213 by calculating a ratio of the value of FGA and total area of the binary image. The FGA is calculated by aggregating NPA of each of the RBCs identified in the binary image. The total area of the image is a summation of the FGA and background area in the binary image. Higher the value of the density of RBCs, higher would be the TC of RBCs.

In an embodiment, the variable value estimation module 213 may estimate the value of the third variable, fourth variable, fifth variable and the sixth variable in step 304.

In an embodiment, the value of the third variable (FHA) for the binary image is estimated by the variable value estimation module 213. The value of the third variable is estimated by computing inverse of the binary image. Further, connected components are identified in the inverse image. Each of the connected components may be identified by determining interconnected group of pixels using 8-connectivity. Each of the connected components represent a pallor region in each of the RBCs. A center of each of the connected components is identified and each of the connected components is dilated. The dilated connected components are added to the binary image. Therefore, the pallor region in each of the RBCs is filled and the pallor region is now a part of the foreground of the binary image. The FGA of the binary image is determined after the above-mentioned steps are performed, for estimating the third variable for the binary image.

In an embodiment, the value of the fourth variable (cell count) is estimated by the variable value estimation module 213 by determining a number of connected components in the binary image. The size of each of the connected components may lie in a range of 3-8 microns (size range of a RBC).

In an embodiment, the value of the fifth variable (cell count ratio) is estimated by the variable value estimation module 213 by determining a percentage ratio of number of connected components of the size of RBC in the binary image and total number of connected components in the binary image. The size of each of the connected components may lie in a range of 3-8 microns (size range of a RBC). Lower value of the fifth variable (cell count ratio) represents that the PBS images 102 is captured from clumped area of the PBS and vice versa.

In an embodiment, the value of the sixth variable (FGA) is estimated by the variable value estimation module 213 by determining value of FGA of the binary image. The FGA is calculated by aggregating NPA of each of the RBCs identified in the binary image.

At step 403, the set of variables are provided to the supervised learning model for estimating the TC of the RBCs. The statistical parameter module 214 computes the set of statistical parameters corresponding to the set of variables. Further, the set of statistical parameters are provided to the supervised learning model. The set of statistical parameters are computed by performing statistical operations on each variable from the set of variables over the plurality of binary images. The statistical operations may include one of, but is not limited to, mean, Standard Deviation (SD), percentiles and interquartile range. For an instance, the statistical parameter module 214 may compute mean of the value of the first variable for each of the plurality of binary images. Further, the statistical parameter module 214 may compute standard deviation of the value of the second variable over the plurality of binary images. The statistical operations to be performed on each of the six independent variables over the plurality of binary images may be pre-defined. For an instance, the set of statistical parameters may comprise six mean values corresponding to value of each variable of the set of variables.

In an embodiment, the statistical parameter module 214 may compute one of mean, SD, P10 (10th percentile), P25 (25th percentile), P50 (50th percentile), P75 (75th percentile) and P90 (90th percentile) of the value of the first variable computed by the variable value estimation module 213 for each of the PBS images 102.

Further, the analysis module 215 estimates the TC of RBCs using the set of statistical parameters. The set of statistical parameters is provided to a supervised learning model to estimate the TC of RBCs in the blood smear. The supervised learning model may be trained using at least one of a mean and a standard deviation computed for each variable from the set of variables, over the PBS images 102. The supervised learning model may be one of, but not limited to, the RFRM, the SVRM, the LRM, the Gradient Boosting Regression Model and the k-NN regression Model.

In an embodiment, the analysis module 215 takes as input the set of statistical parameters. The analysis module 215 may employ the SVRM using 10-fold cross validation to identify optimum model parameters. The SVRM model estimates the TC of RBCs based on the training and on set of statistical parameters provided as input to the SVRM.

Figure 6A:
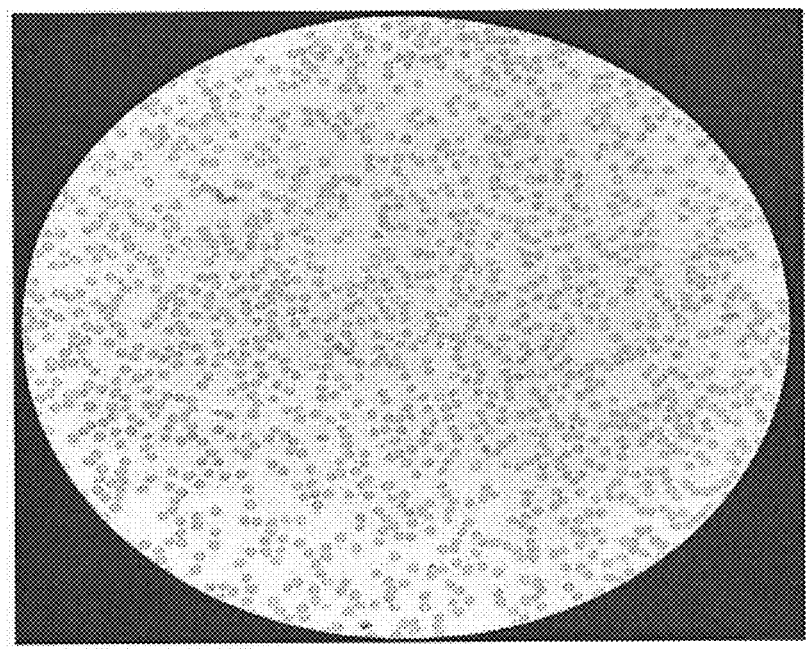
FIGS. 6A, 6B and 6C show different Field of Views (FoVs) of a PBS used for estimating a value of a set of variables, in accordance with some embodiments of the present disclosure.
Figure 6B:
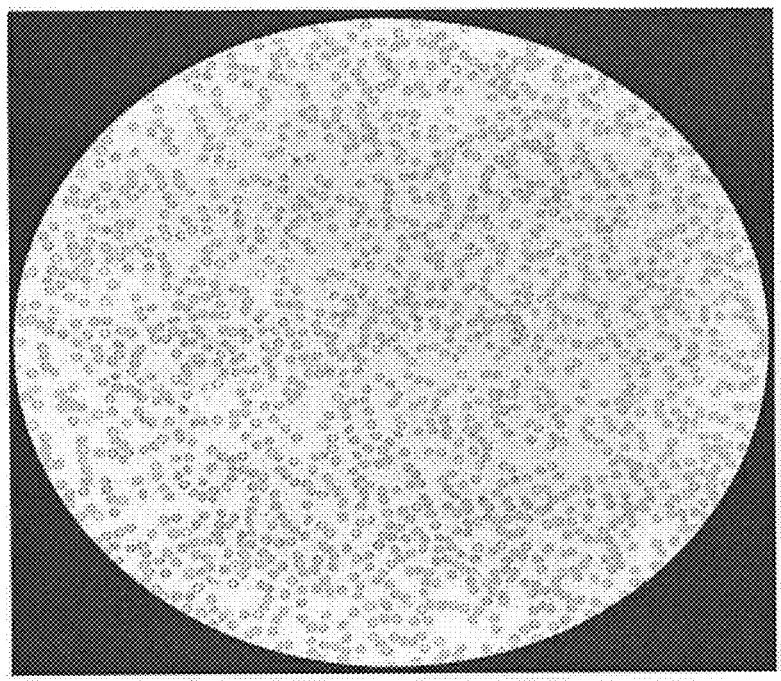
Figure 6C:
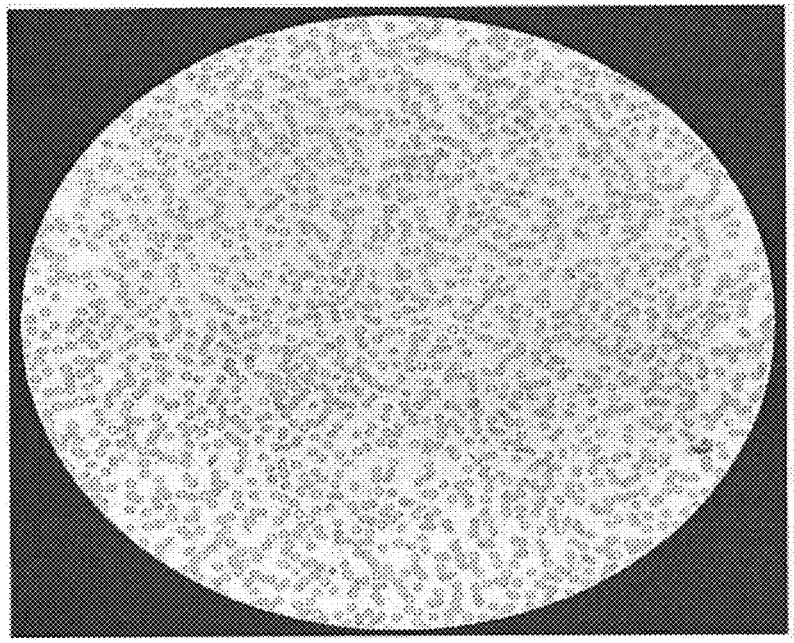

FIGS. 6A, 6B and 6C show different Field of Views (FoVs) of a PBS used for estimating a value of a set of variables. FIG. 6A illustrates a first FoV of a first PBS. FIG. 6B illustrates a second FoV of the first PBS and FIG. 6C illustrates a third FoV of the first PBS. The first FoV, the second FoV and the third FoV correspond to the first PBS.

TABLE 1

| Selected FoV | Value of each variable of set of variables | | | | | |
|---|---|---|---|---|---|---|
| | FGNPA | Density of RBCs | FHA | Cell count | Cell count ratio | FGA |
| First FoV | 1303.33 | 0.291677 | 1058935 | 41 | 0.97619 | 1048829 |
| Second FoV | 1402.466 | 0.32275 | 1171744 | 47 | 0.979167 | 1128607 |
| Third FoV | 1592.771 | 0.371401 | 1348371 | 44 | 0.956522 | 1281750 |

Table 1 indicates the value of each variable from the set of variables estimated by the variable value estimation module 213 for the first FoV, the second FoV and the third FoV. Similarly, the variable value estimation module 213 estimates the value of each variable from the set of variables for other FoVs of the first PBS. In an embodiment, 120 FoVs of the first PBS are acquired by the image acquisition module 211.

TABLE 2

Mean of value of each variable over 120 FoVs

| PBS | Mean FGNPA | Mean Density of RBCs | Mean FHA | Mean Cell count | Mean Cell count ratio | Mean FGA | TC of RBCs |
|---|---|---|---|---|---|---|---|
| First PBS | 2399.948664 | 0.464893 | 1687794.338 | 66.925 | 0.969799 | 1561742.593 | 4.975918504 |

TABLE 3

SD of value of each variable over 120 FoVs

| PBS | SD of FGNPA | SD of Density of RBCs | SD of FHA | SD of Cell count | SD of Cell count ratio | SD of FGA | TC of RBCs |
|---|---|---|---|---|---|---|---|
| First PBS | 124.80752 | 0.02915 | 105830.6989 | 11.439815 | 0.028179 | 81217.24537 | 4.975918504 |

Table 2 indicates estimation of mean of the value of each variable from the set of variables over 120 FoVs of the first PBS. Table 3 indicates estimation of SD of the value of each variable from the set of variables over 120 FoVs of the first PBS. The value of mean and SD of each variable estimated over the 120 FoVs is provided to a SVRM model employed by the analysis module 215. Further, the SVRM module estimates the TC of RBCs to be 4.975918504 RBCs/μL of blood for the first PBS (as indicated in Table 2 and Table 3).

The performance of the TC estimation system 103, was analyzed, and TC estimation system 103 validated on a set of 160 samples. Out of the 160 samples, 94 are prepared using MGG stain and 66 are prepared using Leishman stain. Also, 98 samples were such that blood sample was taken from 49 subjects and both MGG and Leishman stained PBS were prepared.

TABLE 4

| Data Type | Correlation | Root Mean Square Error |
|---|---|---|
| Whole data set | 86.46% | 0.44 (~8.80%) |
| MGG stain | 88.69% | 0.44 (~8.40%) |
| Leishman Stain | 82.02% | 0.47 (~9.40%) |

In an embodiment, the Table 4 indicates the amount of correlation between the TC of RBCs estimated by the TC estimation system 103 and a known TC of RBCs and error involved in estimation of TC of RBCs. As indicated in Table 4, the overall error is below 10% and correlation is above 85% for the whole data set. The correlation for whole data set indicates the correctness of estimation of TC of RBCs. The six independent variables are computed for each of the PBS images 102 corresponding to each PBS in the whole data set. The value of correlation obtained for the whole data set is due to estimation of TC of RBCs by using all the six independent variables during estimation. The performance of the TC estimation system 103 across stains is also consistent as indicated in Table 4. Although, there may slight reduction in correlation for Leishman stain, it is statistically insignificant. Therefore, the TC estimation system 103 may show statistically insignificant variation in performance across different type of stains used for staining of the blood smear.

In an embodiment, the set of variables (combination of the six independent variables) provides an improvement in the performance, rather than one single variable. Table 4 below indicates correlation of TC of RBCs estimated using only the mean of the value of one of the six independent variables.

TABLE 5

| Variable | Correlation |
|---|---|
| Mean of FGNPA | 82% |
| Mean of density | 73.69% |
| Mean of cell count | 81.01% |
| Mean of cell count ratio | −0.17% |
| Mean of foreground | 68.84% |
| Mean of foreground hole filled | 82% |

From Table 5, it may be observed that the overall correlation with actual TC of RBCs using the whole data (as indicated in Table 1) set is greater than correlation with actual TC of RBCs using only one variable of the six independent variables. Also, the error drops by more than 10% when the six independent variables are used together for estimation of TC of RBCs. As indicated by Table 5, the correlation for the estimation of TC of RBCs using only the value of cell count ratio is less. The fifth variable (cell count ratio) is used to determine the region from which the PBS images 102 is captured. Lower value of the fifth variable (cell count ratio) represents that the PBS images 102 is captured from clumped area of the PBS and vice versa.

Computer System

Figure 7:
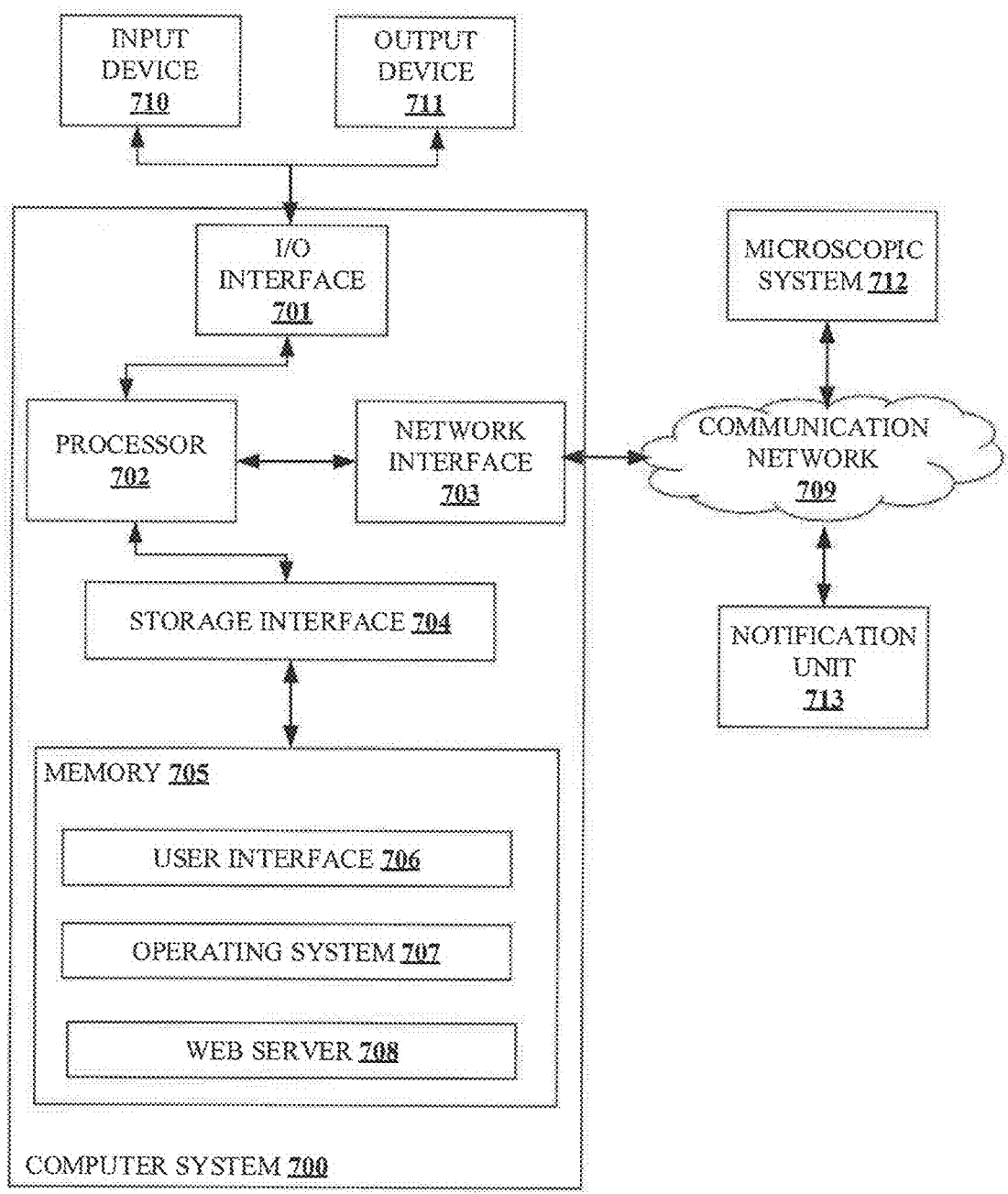
FIG. 7 illustrates a block diagram of an exemplary computer system for implementing embodiments consistent with the present disclosure.

FIG. 7 illustrates a block diagram of an exemplary computer system 700 for implementing embodiments consistent with the present disclosure. In an embodiment, the computer system 700 is used to implement the TC estimation system 103. The computer system 700 may comprise a central processing unit ("CPU" or "processor") 702. The processor 702 may comprise at least one data processor for executing program components for estimating TC of RBCs in the PBS. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 711 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 is connected to the microscopic system 712 and the notification unit 713 through a communication network 709. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. Using the network interface 703 and the communication network 709, the computer system 700 may communicate with the classifier model 712. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 5) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc.

The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc. In some embodiments, computer system 700 may store user/application data 706, such as, the data, variables, records, etc., as described in this disclosure. Such databases may be implemented as fault-tolerant, relational, scalable, secure databases such as Oracle® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 700 may implement a web browser 708 stored program component. The web browser 708 may be a hypertext viewing application, for example MICROSOFT® INTERNET EXPLORER™, GOOGLE® CHROME™⁰, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™, DHTML™, ADOBE® FLASH™, JAVASCRIPT™, JAVA™, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 700 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure relate to a method and system for estimating the TC of RBCs in the PBS. The system acquires the plurality of images from the monolayer region of the PBS, thereby producing an unbiased estimation of the TC of RBCs.

Embodiments of the present disclosure relate to a method and system for estimating the TC of RBCs in the PBS. The said method and system are proficient and robust in estimating TC of RBCs efficiently. The uniqueness lies in computation of the set of variables. The information of the set of variables when appended with the information of RBC and non-RBC cells, helps in building robust set of parameters which are stain agnostic and works well for cases of overlapping cells in images.

Embodiments of the present disclosure relate to a method and system for estimating the TC of RBCs in the PBS. The said method and system is smear agnostic. The system is robust and proficient in estimating the TC of RBCs even when the image capturing device used to capture images of the PBS changes.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 and FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | Environment |
| 101 | Microscopic system |
| 102 | PBS images |
| 103 | TC estimation system |
| 104 | Notification Unit |
| 201 | I/O Interface |
| 202 | Memory |
| 203 | Processor |
| 204 | Data |
| 205 | Training data |
| 206 | Image data |
| 207 | Variables data |
| 208 | Statistical data |
| 209 | Other data |
| 210 | Modules |
| 211 | Image acquisition module |
| 212 | Image patch extraction module |
| 213 | Variable value estimation module |
| 214 | Statistical parameter module |
| 215 | Analysis module |
| 216 | Other modules |
| 700 | Computer System |
| 701 | I/O Interface of the exemplary Computer system |
| 702 | Processor of the exemplary Computer system |
| 703 | Network Interface |
| 704 | Storage Interface |
| 705 | Memory of the exemplary Computer system |
| 706 | User Interface of the exemplary Computer system |
| 707 | Operating System |
| 708 | Web Server |
| 709 | Communication Network |
| 710 | Input Devices |
| 711 | Output device |
| 712 | Microscopic system of the exemplary computer system |
| 713 | Notification unit of the exemplary computer system |

We claim:

1. A method for estimating Total Count (TC) of Red Blood Cells (RBCs) in a blood smear, comprising:
receiving, by a TC estimation system, a plurality of images of a monolayer of a Peripheral Blood Smear (PBS) in a binary format by an image capturing unit configured to scan the monolayer of the PBS, wherein plurality of patches comprising RBC is extracted from each of the plurality of images;
estimating, by the TC estimation system, a value for each variable of a set of variables for each of the plurality of images, the set of variables comprising a Foreground Non-Pallor Area (FGNPA) and a density of the RBCs, wherein a value of the FGNPA of an image among the plurality of images is estimated by calculating a ratio of a value of Foreground Area (FGA) of the image and a mean value of Non-Pallor Area (NPA) of the RBCs identified in the image, wherein the foreground area is calculated by aggregating NPA of blood cells of size of RBC,
wherein a value of the density of the RBCs of an image among the plurality of images is estimated by calculating a ratio of the value of FGA and total area of the image, wherein the total area of the image is a summation of the FGA and background area in the image; and
wherein the set of variables are provided to a supervised learning model for estimating the TC of the RBCs.

2. The method as claimed in claim 1, wherein the set of variables further comprises at least one of Foreground Hole-filled Area (FHA), a cell count, a cell count ratio and a Foreground Area (FGA).

3. The method as claimed in claim 2, wherein the estimation of a value of FHA for each of the plurality of images comprises:
computing inverse of an image from the plurality of images;
identifying connected components in the inverse image, wherein the connected components represent a pallor region in each of the RBCs;
identifying center of each of the connected components and performing dilation to each of the connected components; and
determining the FGA of the image based on the identification, thereby, computing FHA.

4. The method as claimed in claim 2, wherein estimation of a value of cell count comprises determining a number of connected components in each of the plurality of images, of the size of RBC, wherein the size of RBC lie in a range of 3-8 microns.

5. The method as claimed in claim 2, wherein estimation of a value of cell count ratio comprises determining a percentage ratio of number of connected components in the each of the plurality of images, of the size of RBC and total number of connected components in each of the plurality of images.

6. The method as claimed in claim 1, wherein TC of RBCs is estimated by performing statistical operations on the set of variables over the plurality of images to determine a set of statistical parameters, wherein the statistical operations may include at least one of mean, standard deviation and percentiles and wherein the set of statistical parameters are used by the supervised learning model for estimating the TC of RBCs in the blood smear.

7. The method as claimed in claim 1, wherein the supervised learning model is one of a Random Forest Regression Model, a Support Vector Regression Model, a Linear Regression Model, a Gradient Boosting Regression Model and a k-Nearest Neighbors (k-NN) regression Model.

8. The method as claimed in claim 1, wherein the supervised learning model is trained using at least one of a mean and a standard deviation of each variable from the set of variables, over the plurality of images.

9. A TC estimation system, for estimating Total Count (TC) of Red Blood Cells (RBCs) in a blood smear, comprising:
a processor; and
a memory, communicatively coupled to the processor, storing processor executable instructions, which, on execution causes the processor to:
receive, a plurality of images of a monolayer of a Peripheral Blood Smear (PBS) in a binary format by an image capturing unit configured to scan the monolayer of the PBS, wherein plurality of patches comprising RBC is extracted from each of the plurality of images;
estimate, a value for each variable of a set of variables for each of the plurality of images, the set of variables comprising a Foreground Non-Pallor Area (FGNPA) and a density of the RBCs,
wherein a value of the FGNPA of an image among the plurality of images is estimated by calculating a ratio of a value of Foreground Area (FGA) of the image and a mean value of Non-Pallor Area (NPA) of the RBCs identified in the image, wherein the foreground area is calculated by aggregating NPA of blood cells of size of RBC,
wherein a value of the density of the RBCs of an image among the plurality of images is estimated by calculating a ratio of the value of FGA and total area of the image, wherein the total area of the image is a summation of the FGA and background area in the image; and wherein the set of variables are provided to a supervised learning model for estimating the TC of the RBCs.

10. The TC estimation system as claimed in claim 9, wherein the set of variables further comprises at least one of Foreground Hole-filled Area (FHA), a cell count, a cell count ratio and a Foreground Area (FGA).

11. The TC estimation system as claimed in claim 10, wherein the estimation of a value of FHA for each of the plurality of images comprises:
- computing inverse of an image from the plurality of images;
- identifying connected components in the inverse image, wherein the connected components represent a pallor region in each of the RBCs;
- identifying center of each of the connected components and performing dilation to each of the connected components; and
- determining the FGA of the image based on the identification, thereby, computing FHA.

12. The TC estimation system as claimed in claim 10, wherein estimation of a value of cell count comprises determining a number of connected components in each of the plurality of images, of the size of RBC, wherein the size of RBC lie in a range of 3-8 microns.

13. The TC estimation system as claimed in claim 10, wherein estimation of a value of cell count ratio comprises determining a percentage ratio of number of connected components in the each of the plurality of images, of the size of RBC and total number of connected components in each of the plurality of images.

14. The TC estimation system as claimed in claim 9, wherein TC of RBCs is estimated by performing statistical operations on the set of variables over the plurality of images to determine a set of statistical parameters, wherein the statistical operations may include at least one of mean, standard deviation and percentiles and wherein the set of statistical parameters are used by the supervised learning model for estimating the TC of RBCs in the blood smear.

15. The TC estimation system as claimed in claim 9, wherein the supervised learning model is one of a Random Forest Regression Model, a Support Vector Regression Model, a Linear Regression Model, a Gradient Boosting Regression Model and a k-Nearest Neighbors (k-NN) regression Model.

16. The TC estimation system as claimed in claim 9, wherein the supervised learning model is trained using at least one of a mean and a standard deviation of each variable from the set of variables, over the plurality of images.

* * * * *